(12) United States Patent
Sutardja

(10) Patent No.: US 8,493,028 B2
(45) Date of Patent: Jul. 23, 2013

(54) POWER MANAGEMENT CIRCUIT FOR RECHARGEABLE BATTERY STACK

(75) Inventor: Pantas Sutardja, Los Gatos, CA (US)

(73) Assignee: Marvell World Trade Ltd., St. Michael (BB)

(*) Notice: Subject to any disclaimer, the term of this patent is extended or adjusted under 35 U.S.C. 154(b) by 433 days.

(21) Appl. No.: 12/725,683

(22) Filed: Mar. 17, 2010

(65) Prior Publication Data

US 2010/0253286 A1 Oct. 7, 2010

Related U.S. Application Data

(60) Provisional application No. 61/166,590, filed on Apr. 3, 2009.

(51) Int. Cl.
*H02J 7/00* (2006.01)
(52) U.S. Cl.
USPC .......................... 320/118; 320/116; 320/117
(58) Field of Classification Search
USPC .................................................. 320/116–118
See application file for complete search history.

(56) References Cited

U.S. PATENT DOCUMENTS

| | | | |
|---|---|---|---|
| 5,479,083 A | 12/1995 | Brainard | |
| 5,631,534 A | 5/1997 | Lewis | |
| 6,140,800 A | 10/2000 | Peterson | |
| 2004/0257042 A1* | 12/2004 | Liu et al. | 320/130 |
| 2005/0029987 A1 | 2/2005 | Lin et al. | |
| 2009/0167243 A1* | 7/2009 | Xiao et al. | 320/122 |

FOREIGN PATENT DOCUMENTS

| | | |
|---|---|---|
| JP | 07-322516 | 12/1995 |
| JP | 2008-042970 | 2/2008 |
| JP | 2008-206396 | 9/2008 |

OTHER PUBLICATIONS

Machine Translation of JP2008-206396 A, Sep. 4, 2008.*
Machine translation of JP2008-042970A, Feb. 21, 2008.*
Machine translation JP07-322516A, Dec. 8, 1995.*
International Search Report for Application No. PCT/US2010/029113 (corresponding hereto) mailed Jul. 9, 2010; 11 pages.
Summary of Notice of Reasons for Rejection for Japanese Patent Application No. 2012-503581, Ryuka IP Law Firm, Jan. 29, 2013.

* cited by examiner

*Primary Examiner* — Samuel Berhanu

(57) ABSTRACT

A charge-balancing system includes N circuits and a control module, where N is an integer greater than or equal to 1. Each of the N circuits includes first and second switches connected in series and an inductance having a first end connected between the first and second switches. The control module outputs control signals to control the first and second switches. A second end of the inductance of a first one of the N circuits is connected between two cells of a first pair of 2N series-connected cells of a battery stack. The first and second switches of the first one of the N circuits are connected in parallel to the first pair of 2N series-connected cells.

17 Claims, 9 Drawing Sheets

POWER MANAGEMENT CIRCUIT FOR RECHARGEABLE BATTERY STACK

CROSS-REFERENCE TO RELATED APPLICATIONS

This application claims the benefit of U.S. Provisional Application No. 61/166,590, filed on Apr. 3, 2009. The disclosure of the above application is incorporated herein by reference in its entirety.

FIELD

The present disclosure relates to rechargeable batteries and more particularly to a power management circuit for a rechargeable battery stack.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Rechargeable batteries are used in many applications. The applications may range from portable electronic devices to industrial equipment. For example, the portable electronic devices may include cell phones, cameras, personal digital assistants (PDAs), laptop computers, and notebook computers. The industrial equipment may include fork-lifts, hybrid-electric vehicles, medical equipment, and uninterruptible power supplies.

Rechargeable batteries typically include cells that utilize different chemical technologies and that generate different output voltages. For example, Nickel-Cadmium (NiCd) and Nickel Metal Hydride (NiMH) cells generate an output voltage of 1.2 volts (1.2V). Lithium ion cells generate output voltages ranging from 3.6V to 3.9V.

Many applications utilize voltages that may be greater than the output voltage generated by a single cell. Accordingly, a battery stack of multiple cells may be used to generate output voltages that are greater than the voltage generated by a single cell. For example, a battery stack comprising two cells may generate an output voltage that can power some portable electronic devices. A battery stack comprising hundreds of cells may generate an output voltage that can power some electric vehicles.

Generally, a cell of a battery has a capacity to store a predetermined amount of charge. The capacity may be called a rated capacity of the cell. An amount of charge remaining in the cell at any time may be expressed in terms of a state of charge of the cell. A cell is in a fully charged state when charged to its maximum capacity (e.g., the rated capacity). Conversely, a cell is in a fully discharged state when discharged to a minimum capacity. The output voltage of the cell is a function of the state of charge of the cell.

Occasionally, a cell may be unable to store charge according to its rated capacity. Instead, the cell may store less charge than its rated capacity. A cell may be called a weak cell or a strong cell based on its ability to store charge according to its rated capacity.

For example, a strong cell can store charge nearly equal to its rated capacity when fully charged. Conversely, a weak cell cannot store charge nearly equal to its rated capacity when fully charged. Instead, the weak cell stores considerably less charge than its rated capacity when fully charged.

When cells are connected in series in a battery stack, the same amount of current flows through the cells during charging and discharging. During charging, a weak Cell charges faster than a strong cell and is fully charged before the strong cell. An output voltage of the weak cell reaches its maximum rated value before the strong cell. The weak cell is overcharged when charging is continued to fully charge the strong cell. The output voltage of the weak cell exceeds its maximum rated value when the weak cell is overcharged.

During discharging, the weak cell discharges faster than the strong cell and is fully discharged before the strong cell. The output voltage of the weak cell drops from its maximum rated value faster than the strong cell. The strong cell may reverse charge the weak cell when discharging is continued until the strong cell is fully discharged.

Frequent overcharging and reverse charging adversely impact the number of useful charge-recharge cycles of the cells. Most cells have limited number of useful charge-recharge cycles. For example, lead-acid cells may have 200-500 useful charge-recharge cycles. Nickel-Cadmium (NiCd) cells may have 500-1200 useful charge-recharge cycles. Lithium ion cells may have 300-500 useful charge-recharge cycles. The number of useful charge-recharge cycles is considerably reduced when the cells weaken and are overcharged for a prolonged period of time. Moreover, the cells may be damaged when the weak cells are completely discharged and are reversed charged.

To prevent overcharging and over-discharging of the weak cells, the battery stack may be operated at less than its rated capacity. For example, a charging cycle of the battery stack may be terminated when the weak cell is fully charged. Terminating the charging cycle when the weak cell is fully charged may prevent other cells in the battery stack from fully charging. As a result, the battery stack may supply less power than its rated capacity.

Conversely, a discharge cycle of the battery stack may be terminated when the weak cell is fully discharged. Terminating the discharge cycle when the weak cell is fully discharged may prevent other cells in the battery stack from fully discharging.

Operating the battery stack at less than its rated capacity may result in waste of unused capacity of the battery stack. Additionally, operating the battery stack at less than its rated capacity may increase the number of charge-recharge cycles.

Instead, each cell of the battery stack may be monitored individually. The charging and discharging of each cell may be controlled to prevent damage to the weak cells. For example, controllable dissipative bypass devices may be used with each cell. A controller that controls charging and discharging may sense when a weak cell is fully charged. The controller may turn on a dissipative bypass device associated with the weak cell when the weak cell is fully charged. The dissipative bypass device bypasses the weak cell from further charging While charging of other cells continues until their rated capacities are reached. Thus, the dissipative bypass device prevents overcharging of the weak cell.

Additionally, the controller may sense when the weak cell is nearly fully discharged. The controller may disable further discharging of the battery stack when the weak cell is nearly fully discharged. Thus, the controller may prevent over-discharging of weak cell.

This approach protects the weak cells from being overcharged and over-discharged. However, the useful capacity of the strong cells is not available for utilization. Further, using

3 dissipative bypass devices reduces round-trip charge/discharge efficiency during charging.

SUMMARY

A charge-balancing system comprises N circuits and a control module, where N is an integer greater than or equal to 1. Each of the N circuits includes first and second switches connected in series and an inductance having a first end connected between the first and second switches. The control module outputs control signals to control the first and second switches. A second end of the inductance of a first one of the N circuits is connected between two cells of a first pair of 2N series-connected cells of a battery stack. The first and second switches of the first one of the N circuits are connected in parallel to the first pair of 2N series-connected cells.

In another feature, the control module transfers charge between the two cells of the first pair of 2N series-connected cells via the inductance based on a duty cycle of the control signals during at least one of charging and discharging cycles of the battery stack.

In another feature, the control module transfers the charge until a difference between respective output voltages of the two cells of the first pair of 2N, series-connected cells is less than or equal to a predetermined threshold.

In another feature, when a first cell of the first pair of 2N series-connected cells charges faster than a second cell of the first pair of 2N series-connected cells, the control module transfers a first charge from the first cell of the first pair of 2N series-connected cells to the second cell of the first pair of 2N series-connected cells via the inductance based on a duty cycle of the control signals.

In another feature, the control module transfers the first charge when a state of charge of the first cell of the first pair of 2N series-connected cells is less than a fully charged state by a first predetermined threshold.

In another feature, the control module transfers a second charge from the second cell of the first pair of 2N series-connected cells to the first cell of the first pair of 2N series-connected cells during a discharge cycle when the state of charge is greater than a fully discharged state by a second predetermined threshold.

In another feature, the control module transfers the second charge until a first output voltage of the first cell of the first pair of 2N series-connected cells is greater than a second output voltage of the second cell of the first pair of 2N series-connected cells.

In another feature, the control module adjusts a duty cycle of the control signals based on an output voltage of the battery stack during at least one of charging and discharging cycles of the battery stack.

In still other features, a method comprises connecting first and second switches of each of N circuits in series, where N is an integer greater than or equal to 1. The method further comprises connecting a first end of an inductance between the first and second switches, where each of the N circuits includes the inductance. The method further comprises connecting a second end of the inductance of a first one of the N circuits between two cells of a first pair of 2N series-connected cells of a battery stack. The method further comprises connecting the first and second switches of the first one of the N circuits in parallel to the first pair of 2N series-connected cells. The method further comprises outputting control signals to control the first and second switches.

In another feature, the method further comprises transferring charge between the two cells of the first pair of 2N series-connected cells via the inductance based on a duty cycle of the control signals during at least one of charging and discharging cycles of the battery stack.

In another feature, the method further comprises transferring the charge until a difference between respective output voltages of the two cells of the first pair of 2N series-connected cells is less than or equal to a predetermined threshold.

In another feature, the method further comprises transferring a first charge from a first cell of the first pair of 2N series-connected cells to a second cell of the first pair of 2N series-connected cells via the inductance based on a duty cycle of the control signals when the first cell charges faster than the second cell.

In another feature, the method further comprises transferring the first charge when a state of charge of the first cell is less than a fully charged state by a first predetermined threshold.

In another feature, the method further comprises transferring a second charge from the second cell to the first cell during a discharge cycle when the state of charge is greater than a fully discharged state by a second predetermined threshold.

In another feature, the method further comprises transferring the second charge until a first output voltage of the first cell is greater than a second output voltage of the second cell.

In another feature, the method further comprises adjusting a duty cycle of the control signals based on an output voltage of the battery stack during at least one of charging and discharging cycles of the battery stack.

In other features, the method further comprises sensing a first voltage across the first pair of 2N series-connected cells, sensing a second voltage at the second end of the inductance, and determining respective output voltages of the two cells of the first pair of 2N series-connected cells based on the first and second voltages.

In another feature, the method further comprises adjusting a duty cycle of the control signals based on at least one of the output voltages during at least one of charging and discharging cycles of the battery stack.

In other features, the method further comprises generating the control signals and modulating pulse widths of the control signals based on a duty cycle.

In another feature, the method further comprises disconnecting the battery stack when an output voltage of the battery stack decreases to less than a predetermined voltage.

In other features, the method further comprises connecting a second end of an inductance of a second one of the N circuits between two cells of a second pair of 2N series-connected cells of the battery stack when N is greater than or equal to 3. The method further comprises connecting first and second switches of the second one of the N circuits in parallel to the second pair of 2N series-connected cells. The method further comprises connecting the first and second pairs of 2N series-connected cells in series. The method further comprises connecting the second switch of the first one of the N circuits to the first switch of the second one of the N circuits.

In other features, the method further comprises connecting a second end of an inductance of a third one of the N circuits between the second and first switches of the first and second ones of the N circuits, respectively. The method further comprises connecting first and second switches of the third one of the N circuits in parallel to the first and second pairs of 2N series-connected cells.

In other features, the method further comprises connecting a second end of an inductance of a fourth one of the N circuits between two cells of a third pair of 2N series-connected cells of the battery stack when N is greater than or equal to 5. The method further comprises connecting first and second switches of the fourth one of the N circuits in parallel to the third pair of 2N series-connected cells. The method further comprises connecting the second switch of the fourth one of the N circuits to the first switch of the first one of the N circuits. The method further comprises connecting the third pair of 2N series-connected cells in series to the first and second pairs of 2N series-connected cells.

In other features, the method further comprises connecting a second end of an inductance of a fifth one of the N circuits between the second and first switches of the fourth and first ones of the N circuits, respectively. The method further comprises connecting first and second switches of the fifth one of the N circuits in parallel to the third and first pairs of 2N series-connected cells.

In still other features, the systems and methods described above are implemented by a computer program executed by one or more processors. The computer program can reside on a tangible computer readable medium such as but not limited to memory, nonvolatile data storage, and/or other suitable tangible storage mediums.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

Figure 1:
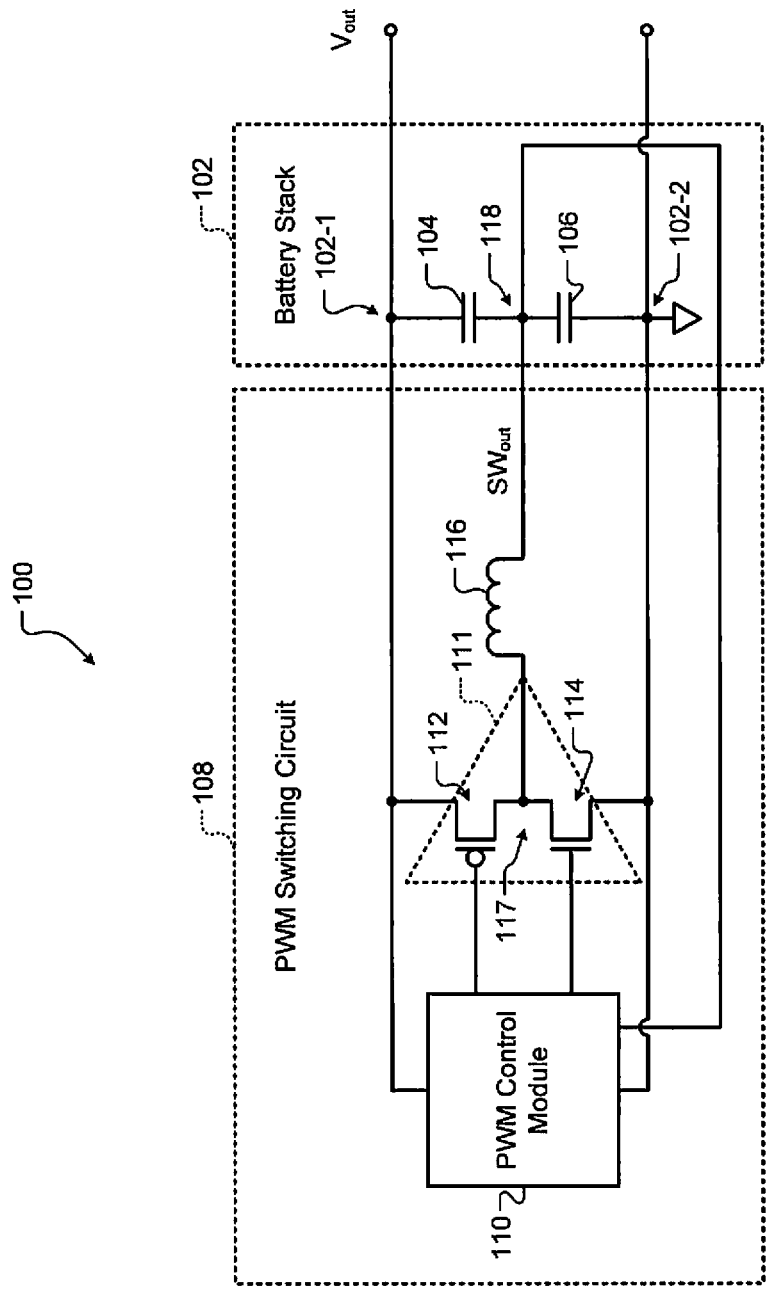
FIG. 1 is a schematic of a power management system for controlling a rechargeable battery stack.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical OR. It should be understood that steps within a method may be executed in different order without altering the principles of the present disclosure.

As used herein, the term module may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

The present disclosure relates to utilizing inductive energy storage to move charge in and out of each cell in a battery stack. A pulse-width modulation (PWM) switching circuit is used to control charging and discharging. A duty cycle of the PWM switching circuit is adjusted to source/sink current to/from cells via an inductor. Using an inductor for energy storage while sourcing/sinking current to/from cells minimizes energy loss.

For example, the PWM switching circuit sources a net positive current by discharging a weak cell and charging a strong cell during charging. The PWM switching circuit sources current when the weak cell is fully charged and the strong cell is not yet fully charged. Specifically, the PWM switching circuit transfers charge from the weak cell to the strong cell when the weak cell is fully charged. Transferring charge from the weak cell to the strong cell prevents the weak cell from overcharging while the strong cell charges to its full capacity.

Additionally, the PWM switching circuit sinks current by discharging the strong cell and charging the weak cell during discharging. The PWM switching circuit transfers charge from the strong cell to the weak cell when the weak cell discharges faster than the strong cell. Transferring charge from the strong cell to the weak cell prevents over-discharging of the weak cell.

Transferring charge from one cell to another equalizes output voltages of the cells during charging and discharging. The process of equalizing output voltages by transferring charge from one cell to another is called cell balancing or voltage balancing.

At the end of cell balancing, the output voltages of the cells may be nearly equal. A small difference may exist between the output voltages. The difference may be less than or equal to a predetermined threshold. The predetermined threshold may be nearly equal to zero. The predetermined threshold may depend on various factors. The factors may include types of cells and total number of cells used in the battery stack. Additionally, the factors may include voltage ratings and age of the cells. For example only, the predetermined threshold may be equal to a fraction of one volt (e.g., 0.05V or 0.2V). Alternatively, the predetermined threshold may be equal to a small percentage of the voltage ratings (e.g., 0.5% or 2%).

The PWM switching circuit may be operated in a sustained mode or a selective mode. In the sustained mode, the PWM switching circuit is turned on during charging and discharging. The PWM switching circuit may equalize the output voltages of the cells irrespective of an overall state of charge of the battery stack. Accordingly, the PWM switching circuit draws power from the battery stack and drains the battery stack in the sustained mode.

Alternatively, the PWM switching circuit may be operated in the selective mode. In the selective mode, the PWM switching circuit is turned off when charge levels of the cells are within a predetermined range. The PWM switching circuit is turned on when a charge level of one cell is outside the predetermined range.

The predetermined range has an upper threshold and a lower threshold. The upper threshold is slightly less than the rated capacity of the cells. For example only, the upper threshold may be 95% of the rated capacity. The lower threshold may be slightly greater than zero. For example only, the lower threshold may be 5% of the rated capacity. Thus, the upper threshold indicates when a cell is nearly fully charged. The lower threshold indicates when a cell is nearly fully discharged.

The PWM switching circuit may be turned on during charging when a cell is charged to 95% of its rated capacity. Additionally, the PWM switching circuit may be turned on during discharging when a cell is discharged to 5% of its rated capacity.

Further, when a cell (e.g., a weak cell) discharges to less than or equal to the lower threshold, the PWM switching circuit may not perform cell balancing. Instead, the PWM switching circuit may use charge from the strong cell to charge the weak cell until charge levels of the weak and strong cells nearly equalize. Since the weak cell has less capacity than the strong cell, the output voltage of the weak cell becomes greater than the output voltage of the stronger cell. This prevents the strong cell from reverse charging the weak cell.

Referring now to FIG. 1, a power management system 100 for controlling a rechargeable battery stack 102 is shown. For example only, the rechargeable battery stack 102 comprises two cells: a first cell 104 and a second cell 106. The first cell 104 is connected to the second cell 106 in series.

The power management system 100 comprises a PWM switching circuit 108 that controls the rechargeable battery stack 102 (hereinafter battery stack 102). The PWM switching circuit 108 is connected across two outside terminals 102-1, 102-2 of the battery stack 102 as shown. The battery stack 102 is detachable from the PWM switching circuit 108. The PWM switching circuit 108 is portable and can be plugged into the battery stack 102. In some implementations, the PWM switching circuit 108 may be integrated into the battery stack 102.

The PWM switching circuit 108 comprises a PWM control module 110, a driver circuit ill and an inductance 116. The driver circuit 111 comprises a first switch 112, a second switch 114. The first and second switches 112, 114 and the inductance 116 may be collectively called a basic cell balancing circuit. The first and second switches 112, 114 may be implemented by semiconductor switching devices. For example only, the first and second switches 112, 114 may be implemented by metal-oxide semiconductor field-effect transistors (MOSFETs).

The PWM control module 110 drives the first and second switches 112, 114 at an adjustable duty cycle. A first terminal of the inductance 116 is connected to the first and second switches 112, 114 at a node 117. A second terminal of the inductance 116 is connected to a node 118 of the battery stack 102. The first cell 104 is connected to the second cell 106 at the node 118. The PWM switching circuit 108 generates an output voltage $SW_{out}$ at the node 118.

In a steady state condition, $SW_{out}$ is proportional to the duty cycle of the PWM switching circuit 108. When the duty cycle is 50%, $SW_{out}$ is one-half of an input voltage of the PWM switching circuit 108. An output voltage $V_{out}$ of the battery stack 102 is the input voltage of the PWM switching circuit 108. At 50% duty cycle, no current flows through the node 118 when output voltages of the first and second cells 104, 106 are equal. Accordingly, the PWM switching circuit 108 may adjust the duty cycle based on $V_{out}$ to perform cell balancing. Alternatively, the PWM switching circuit 108 may adjust the duty cycle based on the output voltages of the first and second cells 104, 106.

The output voltage $SW_{out}$ can be greater or less than one-half of $V_{out}$ when the duty cycle is not 50%. Accordingly, by adjusting the duty cycle, the PWM switching circuit 108 can source or sink current through the node 118. When the PWM switching circuit 108 sources current (net positive current output), the first cell 104 may discharge, and the second cell 106 may charge. Conversely, when the PWM switching circuit 108 sinks current, the second cell 106 may discharge, and the first cell 104 may charge.

During the charging cycle of the battery stack 102, a weak cell (e.g., the first cell 104) may be fully charged before a strong cell (e.g., the second cell 106). When the weak cell is fully charged, the PWM switching circuit 108 sources current. The PWM switching circuit 108 transfers charge from the weak cell to the strong cell. This prevents overcharging of the weak cell.

During the discharge cycle of the battery stack 102, the weak cell discharges faster than the strong cell. The output voltage of the weak cell drops below the output voltage of the strong cell. The PWM switching circuit 108 sinks current and transfers charge from the strong cell to the weak cell. The PWM switching circuit 108 sinks current until the charge levels of the first and second cells 104, 106 are nearly equal. This increases the output voltage of the first cell 104 to a value greater than the output voltage of the second cell 106. This prevents over-discharging and reverse charging of the first cell 104. Further, this allows the battery stack 102 to extract more energy from the first and second cells 104, 106.

The PWM switching circuit 108 may operate in the sustained mode or the selective mode. In the sustained mode, the PWM switching circuit 108 is turned on during charging and discharging. The PWM switching circuit 108 equalizes output voltages of the first and second cells 104, 106. For example, capacities of the first and second cells 104, 106 may differ by 10%. The PWM switching circuit 108 balances the output voltages by sourcing/sinking 5% (i.e., 10%/2) of the output/input current of the battery stack 102.

In the sustained mode, the PWM switching circuit 108 consumes a small amount of current. The PWM switching circuit 108 draws the current from the battery stack 102 and drains the battery stack 102. The PWM switching circuit 108 drains the battery stack 102 although no net output/input current flows through the battery stack 102. For example, the PWM switching circuit 108 drains the battery stack 102 when no load is connected to the battery stack 102.

The PWM switching circuit 108 may also operate in the selective mode. In the selective mode, the PWM switching circuit 108 is turned off when the charge levels of the first and second cells 104, 106 are within a predetermined range. For example, the predetermined range may be from 5% to 95% of the rated capacity of the first and second cells 104, 106. The PWM switching circuit 108 turns on when the charge level of one of the first and second cells 104, 106 cells is outside the predetermined range.

For example, the PWM switching circuit 108 may turn on during charging when the first cell 104 is charged to 95% of its rated capacity before the second cell 106. Additionally, the PWM switching circuit 108 may turn on when first cell 104 discharges to less than or equal to 5% of the rated capacity before the second cell 106.

Further, the PWM switching circuit 108 may not perform cell balancing when the charge level of the first cell 104 is less than or equal to 5%. That is, the PWM switching circuit 108 may not equalize the output voltages of the first and second cells 104, 106. Instead, the PWM switching circuit 108 may use charge from the second cell 106 to increase the output voltage of the first cell 104.

Specifically, the PWM switching circuit 108 may transfer charge from the second cell 106 to the first cell 104 until charge levels of the first and second cells 104, 106 are nearly equal. Consequently, the output voltage of the first cell 104 becomes greater than the output voltage of the second cell 106. This prevents over-discharging and reverse charging of the first cell 104.

Figure 2:
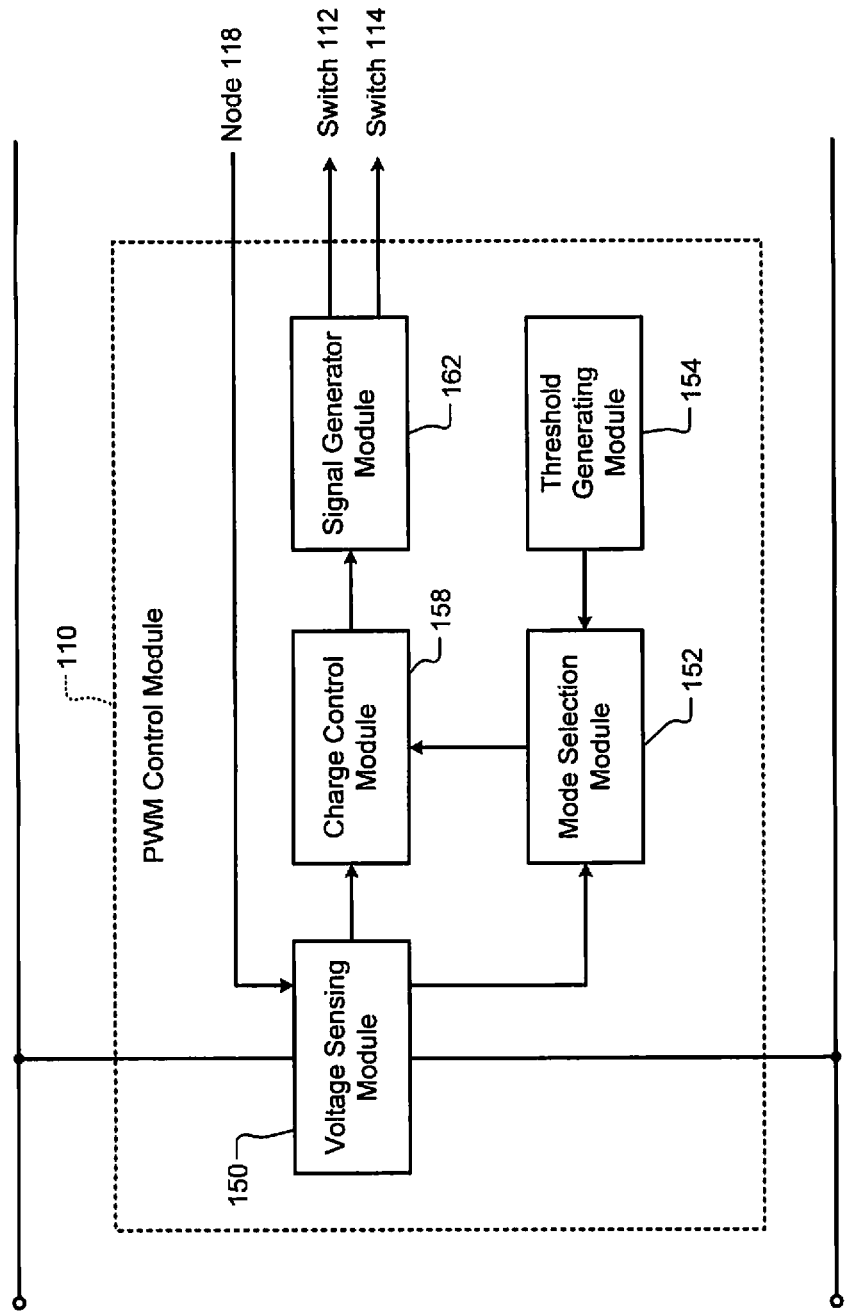
FIG. 2 is a functional block diagram of a pulse-width modulation (PWM) control module of the power management system of FIG. 1.

Referring now to FIG. 2, the PMW control module 110 comprises a voltage sensing module 150, a mode selection module 152, a threshold generating module 154, a charge control module 158, and a signal generating module 162. The voltage sensing module 150 senses the output voltage $V_{out}$ of the battery stack 102. Additionally, the voltage sensing module 150 senses a voltage at the node 118. The voltage at the node 118 is the output voltage of the second cell 106. Accordingly, the voltage sensing module 150 can determine the output voltage of the first cell 104.

By sensing the output voltages during charging/discharging, the voltage sensing module 150 can detect which cell is weak. For example, the first cell 104 is weak if it charges to its rated output voltage before the second cell 106. Alternatively, the first cell 104 is weak if it discharges at a faster rate than the second cell 106.

The mode selection module 152 selects the sustained mode or the selective mode. In the sustained mode, the PWM control module 110 generates PWM signals during charging/discharging regardless of charge levels of the first and second cells 104, 106. In the selective mode, the PWM control module 110 generates the PWM signals depending on output voltages of the first and second cells 104, 106. The mode selection module 152 turns off portions of the PWM switching circuit 108 when the output voltages are within a predetermined range. The portions of the PWM switching circuit 108 are turned on when the output voltages are outside the predetermined range.

The threshold generating module 154 generates lower and upper thresholds that define the predetermined range. For example only, a rated output voltage of the first and second cells 104, 106 may be 3.0V. Thus, $V_{out}$ may be 6.0V when the first and second cells 104, 106 are fully charged. The threshold generating module 154 may select 2.5V and 2.95V as the lower and upper thresholds, respectively. Accordingly, the predetermined range may be 2.5V to 2.95V.

For example only, the threshold generating module 154 may select the lower and upper thresholds based on the following: The output voltage of one of the first and second cells 104, 106 may be slightly less than 2.5V when fully discharged. The output voltage of one of the first and second cells 104, 106 may be slightly greater than 2.95V when fully charged.

The voltage sensing module 150 may determine that the first cell 104 is weak when it charges to 2.95V before the second cell 106. Alternatively, the first cell 104 is weak if its output voltage drops faster than the output voltage of the second cell 106 when discharging.

The mode selection module 152 may turn on the portions of the PWM switching circuit 108 when the first cell 104 charges to 2.95V. Additionally, the mode selection module 152 may turn on the portions of the PWM switching circuit 108 when the first cell 104 discharges to 2.5V. The portions of the PWM switching circuit 108 are turned off when output voltages of the first and second cells 104, 106 are between 2.5V and 2.95V.

During the charging cycle, the voltage sensing Module 150 senses when the first cell 104 is charged to 2.95V before the second cell 106. The charge control module 158 initiates a charge transfer from the first cell 104 to the second cell 106. The charge control module 158 determines a duty cycle of the PWM signals that drive the first and second switches 112, 114. The duty cycle may be based on a sum of the output voltages of the first and second cells 104, 106 (i.e., $V_{out}$). Alternatively, the duty cycle may be based on the output voltages of the first and second cells 104, 106.

The duty cycle determines on/off times of the first and second switches 112, 114. The signal generator module 162 generates the PWM signals according to the duty cycle. The signal generator module 162 modulates pulse widths of the PWM signals based on the duty cycle. The PWM signals output to the first and second switches 112, 114 are complementary to each other. That is, the PWM signals turn on only one of the first and second switches 112, 114 at a time. For example, when the PWM signals turn on the first switch 112, the PWM signals turn off the second switch 114, and vice versa.

Since the second cell 106 is not yet fully charged, the output voltage of the second cell 106 is less than 2.95V. For example, the output voltage of the second Cell 106 may be 2.75V. Accordingly, $V_{out}$ is (2.95V+2.75V)=5.7V. At 50% duty cycle, $SW_{out}$ at node 118 is one-half of 5.7V=2.85V. Thus, $SW_{out}$ is less than the output voltage 2.95V of the first cell 104 and greater than the output voltage 2.75V of the second cell 106.

Accordingly, when the PWM signals turn on the first switch 112, the first cell 104 discharges via the first switch 112. The second switch 114 is turned off. Current flows through the inductance 116 from node 117 to the node 118. The inductance 116 stores energy.

Subsequently, the PWM signals turn off the first switch 112 and turn on the second switch 114. The inductance 116 acts as energy source and discharges the stored energy. Current flows through the inductance 116 from the node 117 to the node 118 and through the second cell 106. The second switch 114 provides a path for the current. Thus, the inductance 116 charges the second cell 106 using the charge from the first cell 104.

The PWM signals drive the first and second switches 112, 114 until the output voltages of the first and second cells 104, 106 equalize. The first cell 104 is not overcharged while the second cell 106 is charged to 2.95V. The charge control module 158 stops the charging cycle when the voltage sensing module 150 senses that the first and second cells 104, 106 are charged to 2.95V.

During the discharge cycle, the voltage sensing module 150 senses when the first cell 104 is discharged to 2.5V before the second cell 106. The charge control module 158 initiates a charge transfer from the second cell 106 to the first cell 104. The charge control module 158 determines the duty cycle of the PWM signals. The duty cycle may be based on the sum of the output voltages of the first and second cells 104, 106 (i.e., $V_{out}$). Alternatively, the duty cycle may be based on the output voltages of the first and second cells 104, 106.

The duty cycle determines on/off times of the first and second switches 112, 114. The signal generator module 162 generates the PWM signals according to the duty cycle. The signal generator module 162 modulates pulse widths of the PWM signals based on the duty cycle. The PWM signals output to the first and second switches 112, 114 are complementary to each other. That is, the PWM signals turn on only one of the first and second switches 112, 114 at a time. For example, when the PWM signals turn on the first switch 112, the PWM signals turn off the second switch 114, and vice versa.

Since the second cell 106 is not yet fully discharged, the output voltage of the second cell 106 is greater than 2.5V. For example, the output voltage of the second cell 106 may be 2.9V. Accordingly, $V_{out}$ is (2.5V+2.9V)=5.4V. At 50% duty cycle, $SW_{out}$ at node 118 is one-half of 5.4V=2.7V. Thus, SW$_{out}$ is greater than the output voltage 2.5V of the first cell 104 and less than the output voltage 2.9V of the second cell 106.

Accordingly, when the PWM signals turn on the second switch 112, the second cell 106 discharges via the second switch 112. The first switch 112 is turned off. Current flows through the inductance 116 from the node 118 to the node 117. The inductance 116 stores energy.

Subsequently, the PWM signals turn off the second switch 114 and turn on the first switch 112. The inductance 116 acts as energy source and discharges the stored energy. Current flows through the inductance 116 from the node 118 to the node 117 and through the first cell 104. The first switch 112 provides a path for the current. Thus, the inductance 116 charges the first cell 104 using the charge from the second cell 106.

The PWM signals drive the first and second switches 112, 114 until the output voltages of the first and second cells 104, 106 equalize. The first cell 104 is not over-discharged to less than 2.5V while the second cell 106 discharges and its output voltage drops to 2.5V. The charge control module 158 stops the discharge cycle when the voltage sensing module 150 senses that the first and second cells 104, 106 are discharged to 2.5V.

Thus, the battery stack 102 is not turned off when the first cell 104 discharges to 2.5V. Instead, the battery stack 102 is used to supply power until output voltages of the first and second cells 104, 106 drop to 2.5V.

Further, the charge control module 158 may not equalize the output voltages of the first and second cells 104, 106 during the discharge cycle. Instead, the charge control module 158 may adjust the duty cycle so that first cell 104 is charged to a higher voltage than the second cell 106. Thus, the second cell 106 does not reverse charge the first cell 104.

The PWM control module 110 may control charge transfers and cell-balancing in other ways. For example, the voltage sensing module 150 may sense voltage at node 117 instead of or in addition to sensing voltage at node 118. Additionally or alternatively, the PWM control module 110 may sense current through one of the nodes 118, 117.

Figure 3:
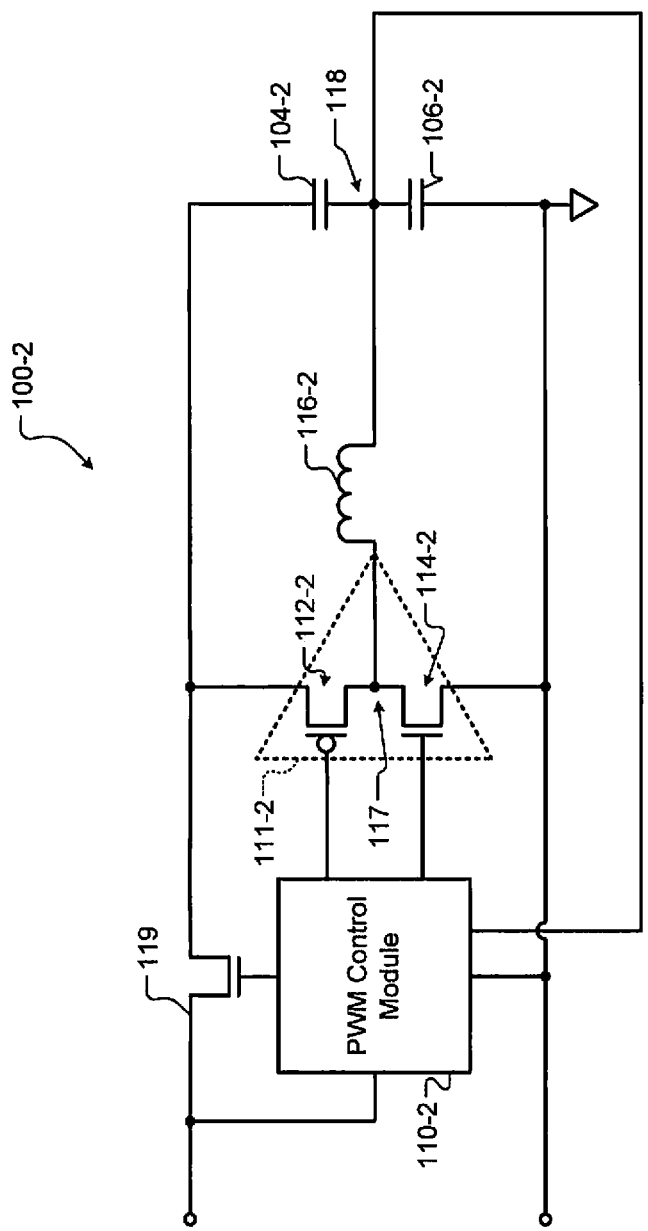
FIG. 3 is a schematic of a power management system for controlling a battery stack comprising two Lithium ion cells.
Figure 4:
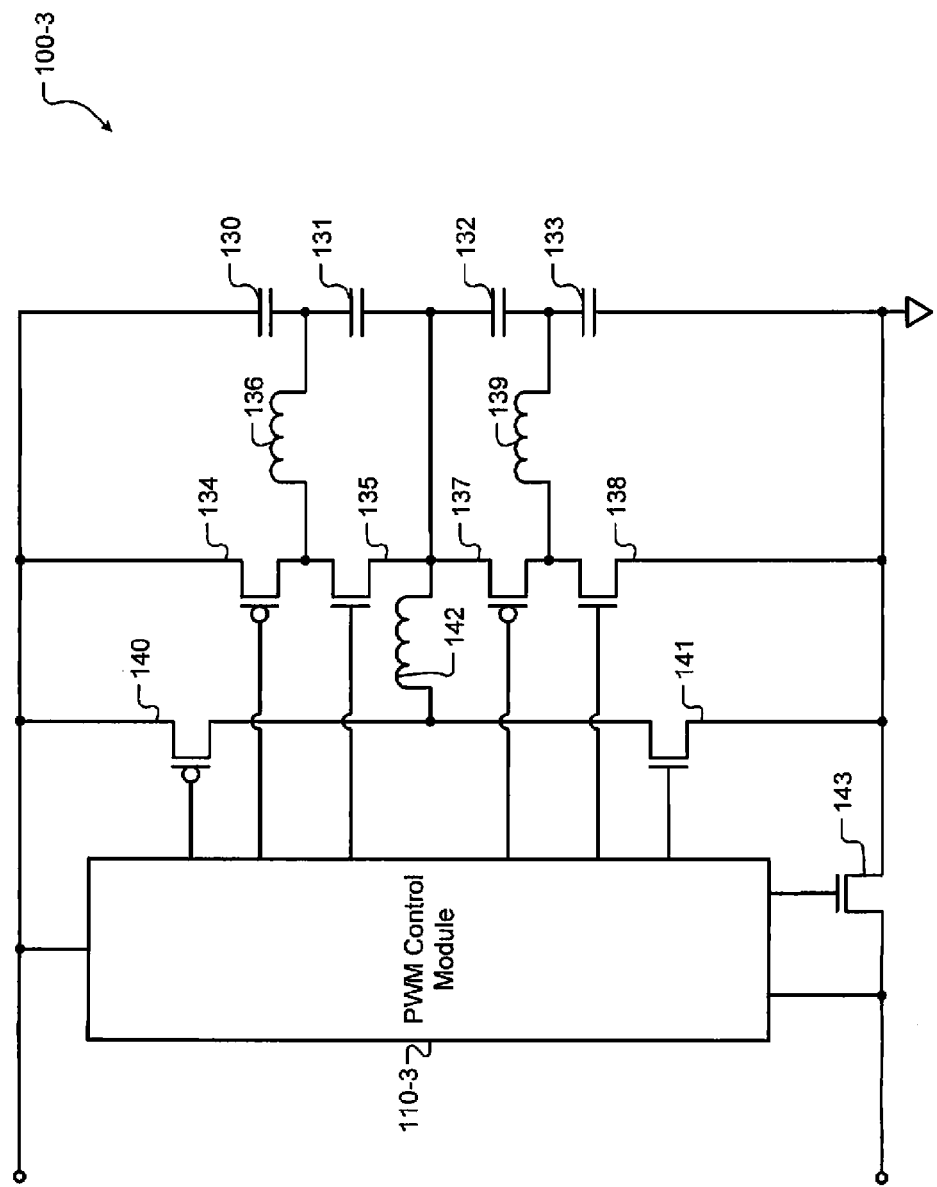
FIG. 4 is a schematic of a power management system for controlling a battery stack comprising four cells.
Figure 5:
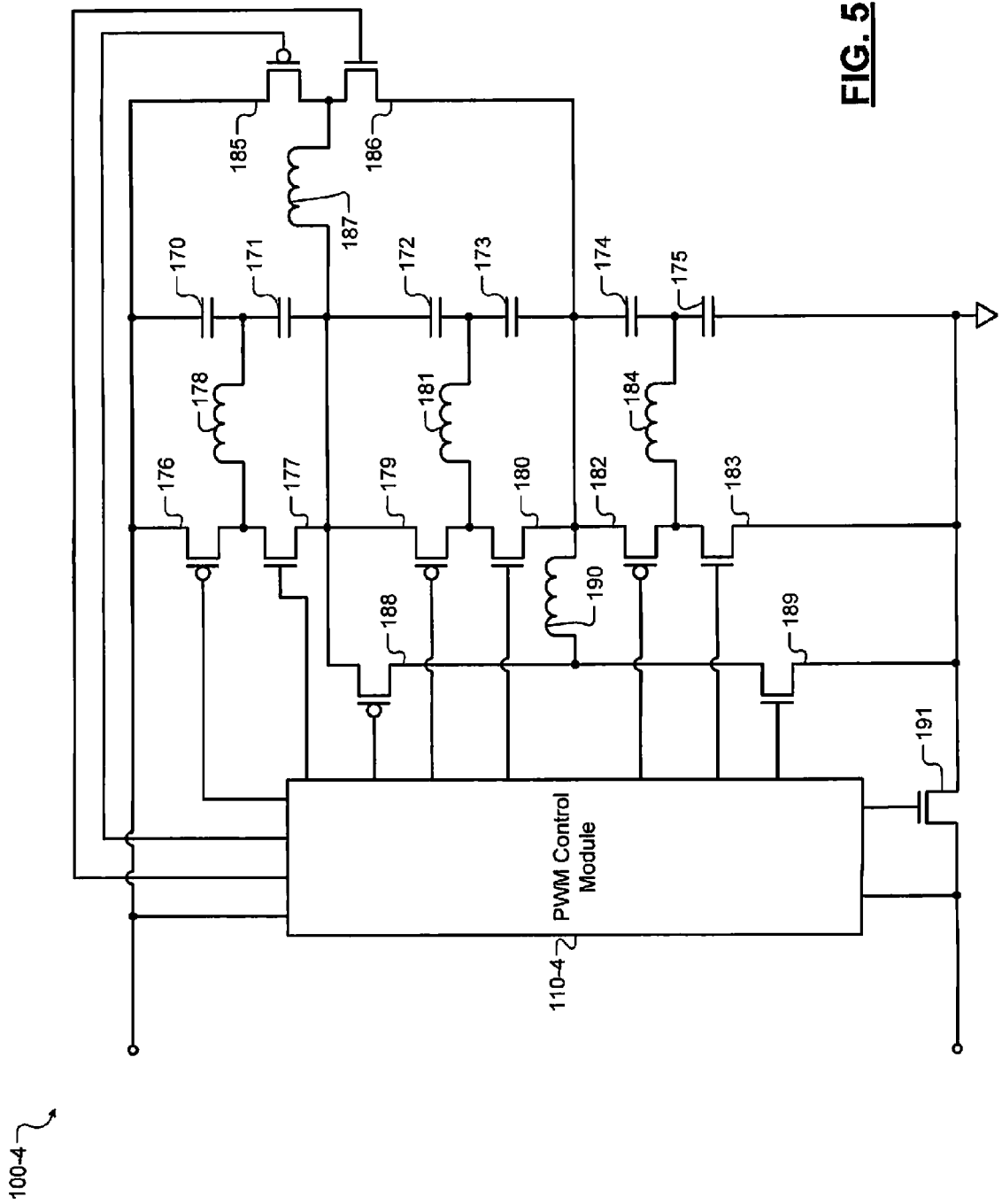
FIG. 5 is a schematic of a power management system for controlling a battery stack comprising six cells.

Referring now to FIGS. 3-5, additional examples of power management systems for controlling battery stacks comprising two cells, four cells, and six cells are shown. In general, the teachings of the present disclosure can be extended to battery stacks comprising 2N cells, where N is an integer greater than or equal to 1. Specifically, the basic cell-balancing circuit comprising the first and second switches 112, 114 and the inductance 116 may be used with every 2 cells. Every balanced 2-cell stack can be regarded as a new cell. A pair of new cells may be balanced by another basic cell-balancing circuit, where the PWM signals are hierarchically applied to the new cells.

In FIG. 3, a power management system 100-2 for Controlling a battery stack comprising two Lithium ion cells 104-2, 106-2 is shown. The battery stack shown may generate an output of 6.6V-7.2V. The cells 104-2, 106-2 are controlled by a PWM control module 110-2 and the basic cell-balancing circuit. The basic cell-balancing circuit comprises a driver circuit 111-2 and an inductance 116-2. The driver circuit 111-2 comprises switches 112-2 and 114-2.

A switch 119 provides over-discharge protection for the battery stack. The switch 119 turns off once the output voltage of the battery stack drops below a predetermined threshold. The battery stack is disconnected from a load when the switch 119 turns off. Accordingly, the load cannot drain the battery stack, and the battery stack does not over-discharge.

The cells 104-2, 106-2 may be similar to the first and second cells 104, 106, respectively. The switches 112-2, 114-2 may be similar to the first and second switches 112, 114, respectively. The inductance 116-2 may be similar to the inductance 116. The PWM control module 110-2 may control the cells 104-2, 106-2 in a similar manner as the PWM control module 110 controls the first and second cells 104, 106.

In FIG. 4, a power management system 100-3 for controlling a battery stack comprising four cells 130-133 is shown. Voltage sensing is not shown for clarity. The four cells 130-133 are controlled by a PWM control module 110-3 and a plurality of the basic cell-balancing circuits. The cells 130 and 131 are controlled by a first cell balancing circuit comprising switches 134, 135 and an inductance 136. The cells 132 and 133 are controlled by a second cell balancing circuit comprising switches 137, 138 and an inductance 139.

The cells 130, 131 and the first cell balancing circuit can be regarded as a first hierarchical cell. The cells 132, 133 and the second cell balancing circuit can be regarded as a second hierarchical cell. The first and second hierarchical cells are controlled in turn by a third cell balancing circuit formed by switches 140, 141 and an inductance 142.

In the first cell balancing circuit, the switches 134, 135 may be similar to the first and second switches 112, 114, respectively. The inductance 136 may be similar to the inductance 116. In the second cell balancing circuit, the switches 137, 138 may be similar to the first and second switches 112, 114, respectively. The inductance 139 may be similar to the inductance 116. Further, the cells 130, 131 may be similar to the first and second cells 104, 106, respectively. The cells 132, 133 may be similar to the first and second cells 104, 106, respectively.

The PWM control module 110-3 may control the first and second hierarchical cells in a similar manner as the PWM control module 110 controls the first and second cells 104, 106. In turn, the PWM control module 110-3 may control the cells 130, 131 in a similar manner as the PWM control module 110 controls the first and second cells 104, 106. Additionally, the PWM control module 110-3 may control the cells 132, 133 in a similar manner as the PWM control module 110 controls the first and second cells 104, 106. A switch 143 provides over-discharge protection. The switch 143 turns off once the output voltage of the battery stack drops below a predetermined threshold.

In FIG. 5, a power management system 100-4 for controlling a battery stack comprising six cells 170-175 is shown. Voltage sensing is not shown for clarity. The six cells 170-175 are controlled by a PWM control module 110-4 and a plurality of the basic cell-balancing circuits. The basic cell-balancing circuits comprise switches and inductances with reference numerals 176-190. The switches and inductances with reference numerals 176-190 may be similar to the first and second switches 112, 114 and the inductance 116. The pairs of cells 170-171, 172-173, and 174-175 may be similar to the pair of the first and second cells 104, 106.

The PWM control module 110-4 hierarchically controls the six cells 170-175 in a similar manner as the PWM control module 110-3 hierarchically controls the four cells 130-133. Specifically, cells 170, 171 are balanced by switches 176, 177 and inductance 178. Cells 172, 173 are balanced by switches 179, 180 and inductance 181. The cells 170, 171, the switches 176, 177, and inductance 178 can be regarded as a first hierarchical cell. The cells 172, 173, the switches 179, 180, and inductance 181 can be regarded as a second hierarchical cell. The first and second hierarchical cells are controlled in turn by switches 185, 186 and inductance 187.

Additionally, cells 174, 175 are balanced by switches 182, 183 and inductance 184. The cells 174, 175, the switches 182, 183, and inductance 184 can be regarded as a third hierarchical cell. The second and third hierarchical cells are controlled in turn by switches 188, 189 and inductance 190. A switch 191 provides over-discharge protection for the battery stack. The switch 191 turns off once the output voltage of the battery stack drops below a predetermined threshold.

Figure 6:
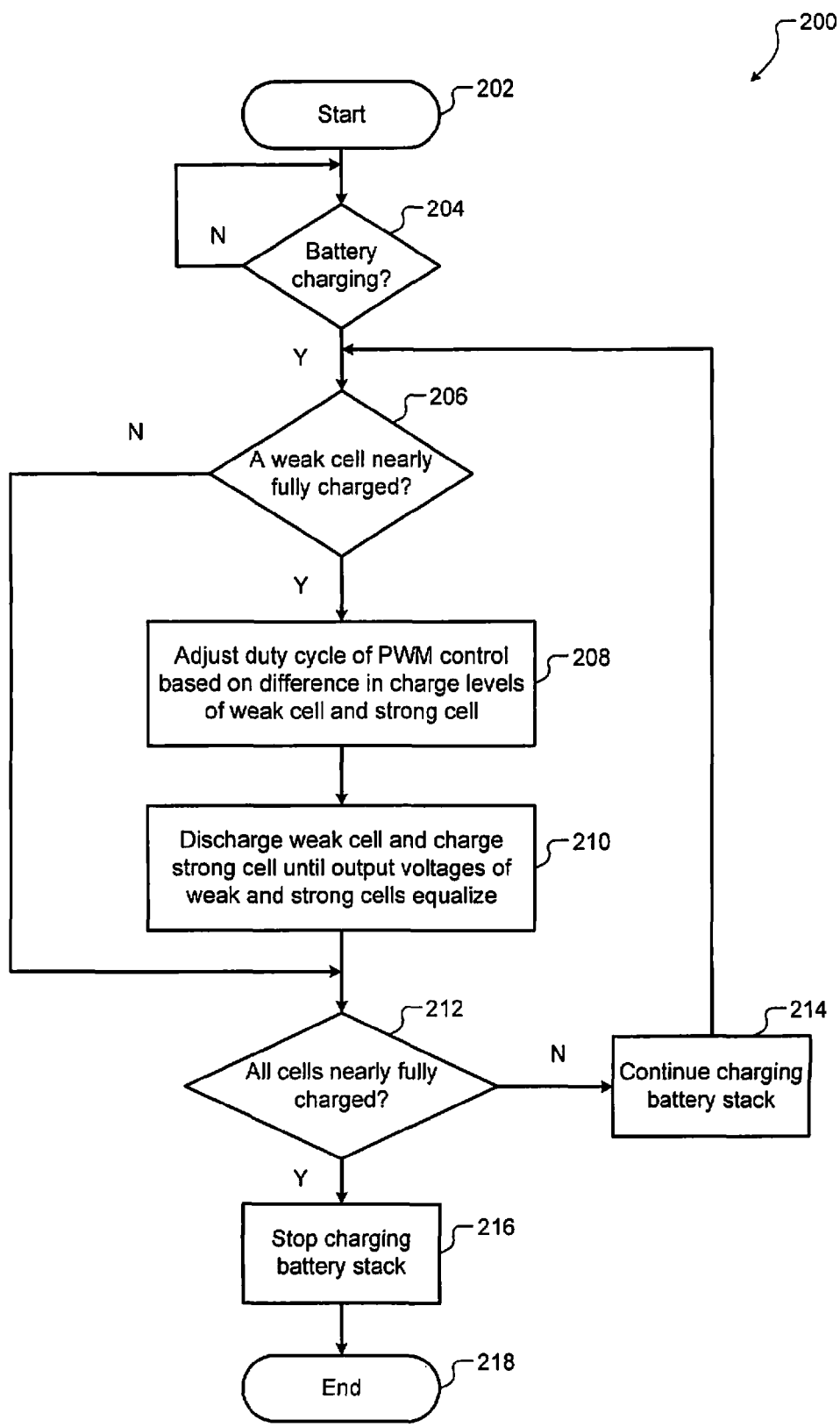
FIG. 6 is a flowchart of a method for charging a battery stack.

Referring now to FIG. 6, a flowchart of a method 200 for charging a battery stack according to the present disclosure is shown. Control begins in step 202. Control determines in step 204 whether the battery stack is charging. Control repeats step 204 when the result of step 204 is false. When the result of step 204 is true, control determines in step 206 whether a weak cell of the battery stack is nearly fully charged.

When the result of step 206 is true, control adjusts the duty cycle of PWM control in step 208. Control adjusts the duty cycle based on a difference in charge levels (i.e., states of charge) of the weak cell and a strong cell. Alternatively, control adjusts the duty cycle based on a difference in output voltages of the weak cell and the strong cell. In step 210, control discharges the weak cell and charges the strong cell according to the duty cycle until output voltages of the weak and strong cells equalize.

At the end of step 210 or when the result of step 206 is false, control determines in step 212 whether the cells in the battery stack are nearly fully charged. Control continues to charge the cells of the battery stack in step 214 when the result of step 212 is false, and control returns to step 206. Control stops charging the cells of the battery stack in step 216 when the result of step 212 is true, and control ends in step 218. Thus, control charges the cells of the battery stack to nearly fully charged states while preventing overcharging of the weak cells.

Figure 7:
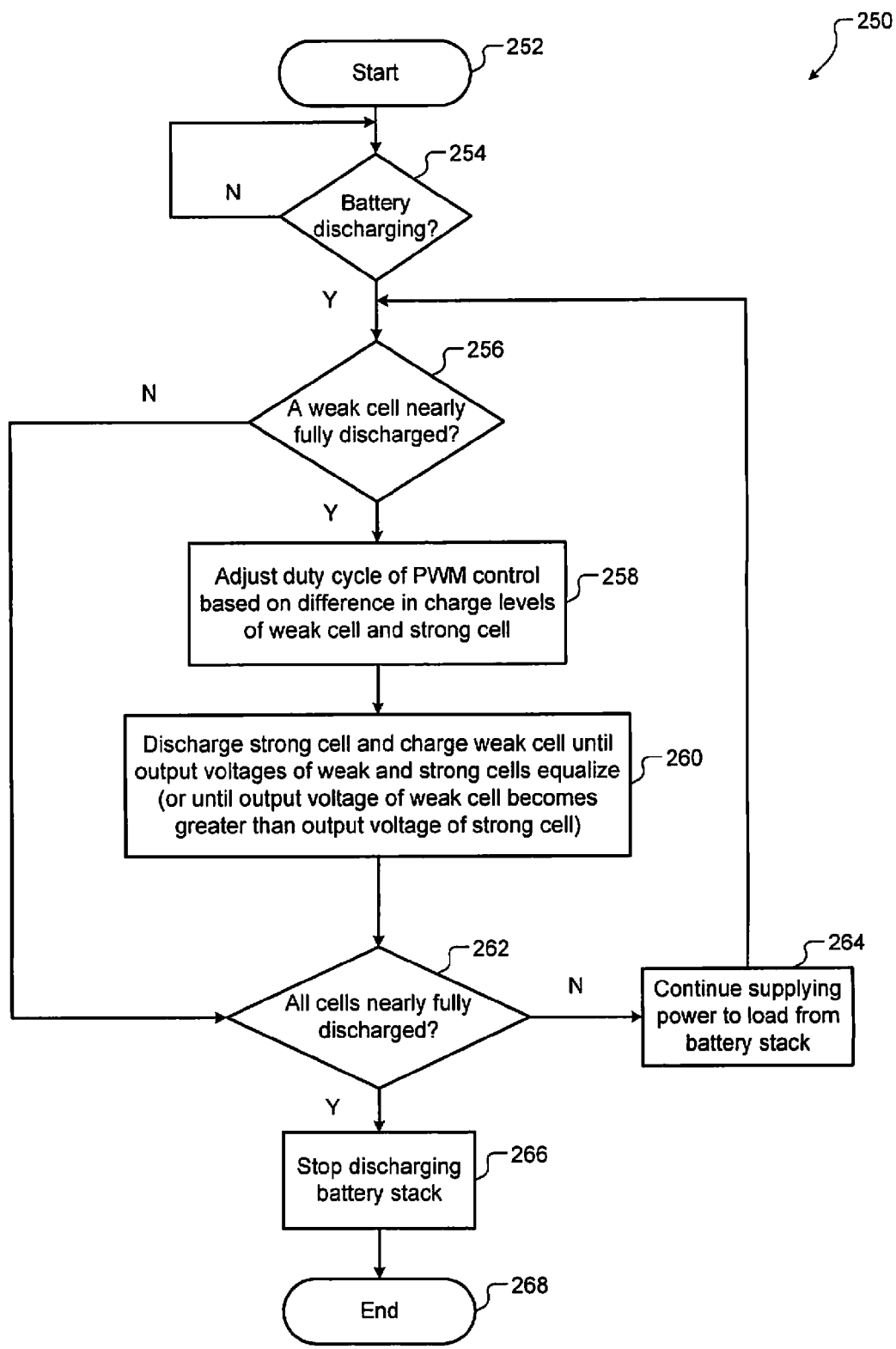
FIG. 7 is a flowchart of a method for discharging a battery stack.

Referring now to FIG. 7, a flowchart of a method 250 for discharging a battery stack according to the present disclosure is shown. Control begins in step 252. Control determines in step 254 whether the battery stack is discharging (e.g., supplying power to a load). Control repeats step 254 when the result of step 254 is false. When the result of step 254 is true, control determines in step 256 whether a weak cell of the battery stack is nearly fully discharged.

When the result of step 256 is true, control adjusts the duty cycle of PWM control in step 258. Control adjusts the duty cycle based on a difference in charge levels (i.e., states of charge) of the weak cell and a strong cell. Alternatively, control adjusts the duty cycle based on a difference in output voltages of the weak cell and the strong cell.

In step 260, control discharges the strong cell and charges the weak cell according to the duty cycle until output voltages of the weak and strong cells equalize. Alternatively, control adjusts the duty cycle and charges the weak cell until the charge levels of the weak cell and the strong cell equalize. Consequently, the output voltage of the weak cell becomes greater than the output voltage of the strong cell.

At the end of step 260 or when the result of step 256 is false, control determines in step 262 whether the cells in the battery stack are nearly fully discharged. Control continues to supply power from the battery stack to a load in step 264 when the result of step 262 is false, and control returns to step 256. Control stops discharging the cells of the battery stack in step 266 when the result of step 262 is true, and control ends in step 268.

Thus, control prevents over-charging, over-discharging, and reverse charging of weak cells in the battery stack. Additionally, control supplies power from the battery stack to the load until the cells of the battery stack are nearly fully discharged.

Figure 8:
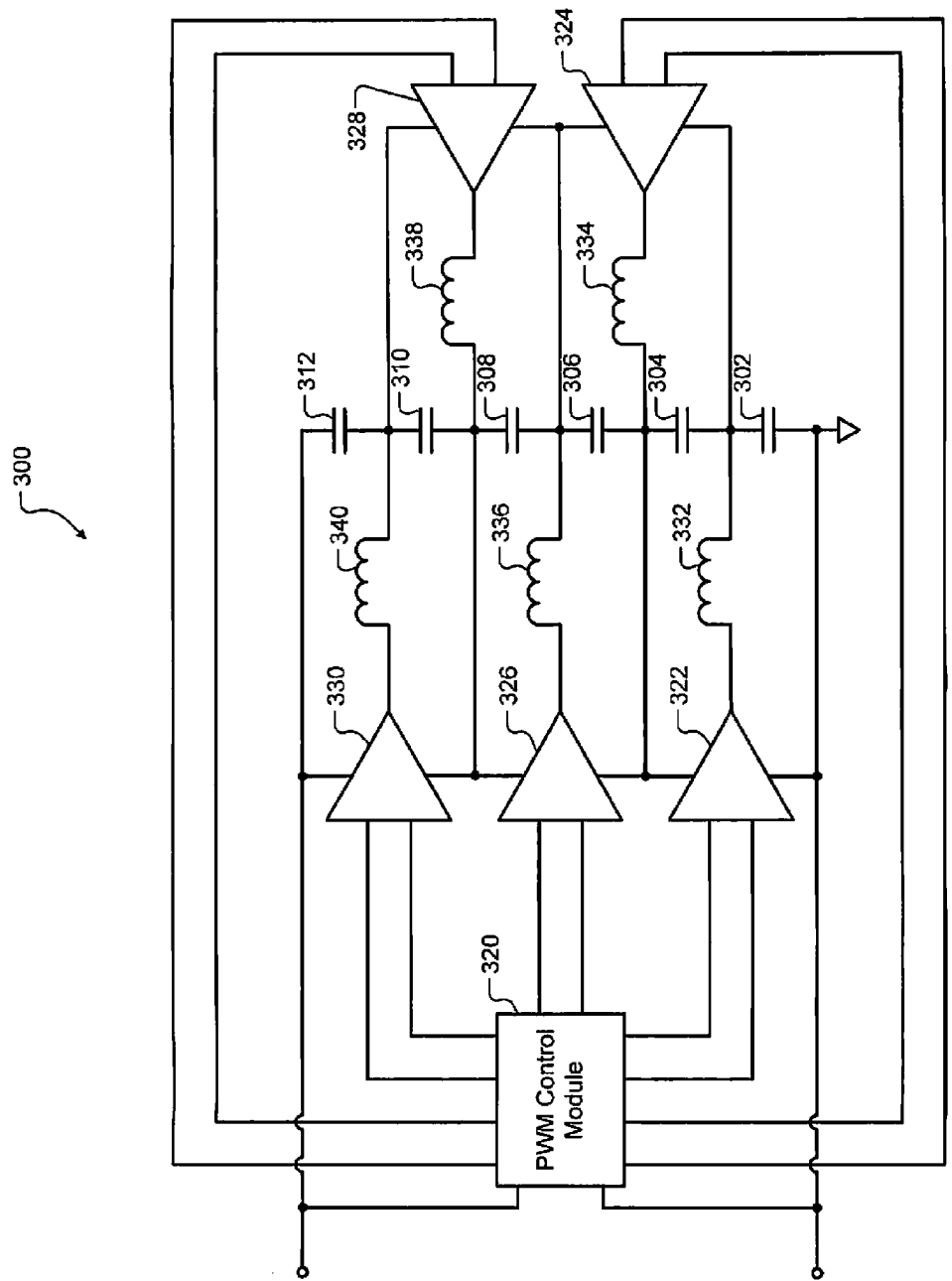
FIG. 8 is a schematic of a power management system for controlling a battery stack using a staggered topology.

Referring now to FIG. 8, a power management system 300 for controlling a battery stack using a staggered topology is shown. The battery stack may comprise N cells connected in series, where N is an integer greater than 1. For example only, the battery stack comprises six cells 302, 304, 306, 308, 310, 312. The six cells are connected in series as shown.

The power management system 300 comprises a PWM switching circuit that controls the battery stack. The PWM switching circuit comprises a PWM control module 320 and (N−1) basic cell balancing circuits. That is, the PWM switching circuit comprises (N−1) sets of a driver circuit and an inductance that are similar to the driver circuit 111 and the inductance 116 shown in FIG. 1, respectively. For example only, when the power management system 300 comprises six cells, the power management system 300 comprises five driver circuits 322, 324, 326, 328, 330 and five inductances 332, 334, 336, 338, 340. The driver circuits 322, 324, 326, 328, 330 may include low-voltage drivers.

The PWM control module 320 drives a pair of switches in each of the driver circuits 322, 324, 326, 328, 330 at an adjustable duty cycle. The switches in each of the driver circuits 322, 324, 326, 328, 330 are similar to the switches 112, 114 of the driver circuit 111 shown in FIG. 1. Based on the duty cycle, the driver circuit 322 and the inductance 332 transfer charge between cells 302, 304 to equalize output voltages of the cells 302, 304 during charging and discharging. The driver circuit 324 and the inductance 334 transfer charge between cells 304, 306 to equalize output voltages of the cells 304, 306 during charging and discharging, and so on.

For example, when a charge level of cell 302 is less than the charge level of cell 304, the driver circuit 322 and the inductance 332 transfer charge from cell 304 to cell 302. Due to the charge transfer, however, the charge level of 304 may become less than the charge level of cell 306. Accordingly, the driver circuit 324 and the inductance 334 may transfer charge from cell 306 to cell 304, and so on. Although not shown, a switch similar to the switch 119 may be used to provide over-discharge protection for the battery stack.

Figure 9:
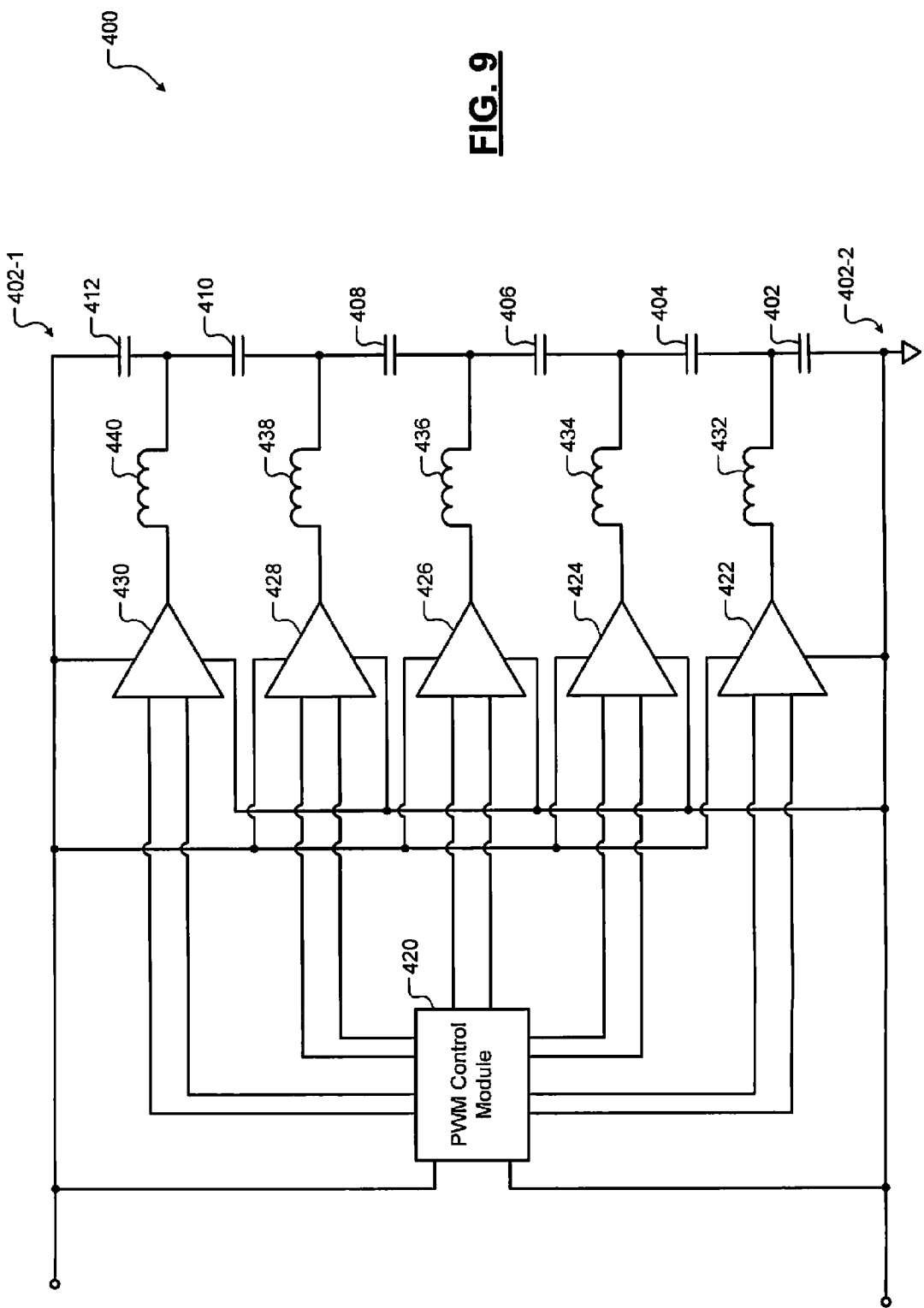
FIG. 9 is a schematic of a power management system for controlling a battery stack using a parallel power supply topology.

Referring now to FIG. 9, a power management system 400 for controlling a battery stack using a parallel power supply topology is shown. The battery stack may comprise N cells connected in series, where N is an integer greater than 1. For example only, the battery stack comprises six cells 402, 404, 406, 408, 410, 412. The six cells are connected in series as shown.

The power management system 400 comprises a PWM switching circuit that controls the battery stack. The PWM switching circuit comprises a PWM control module 420 and (N−1) basic cell balancing circuits. That is, the PWM switching circuit comprises (N−1) sets of a driver circuit and an inductance that are similar to the driver circuit 111 and the inductance 116 shown in FIG. 1, respectively. For example only, since the power management system 400 comprises six cells, the power management system 400 comprises five driver circuits 422, 424, 426, 428, 330 and five inductances 432, 434, 436, 438, 440. The driver circuits 422, 424, 426, 428, 330 may include high-voltage drivers.

Each of the driver circuits 422, 424, 426, 428, 330 is connected in parallel to the output of the battery stack. Specifically, each of the driver circuits 422, 424, 426, 428, 330 is connected across two outside terminals 401-1, 402-2 of the battery stack as shown.

The PWM control module 420 drives a pair of switches in each of the driver circuits 422, 424, 426, 428, 330 at an adjustable duty cycle. The switches in each of the driver circuits 422, 424, 426, 428, 330 are similar to the switches 112, 114 of the driver circuit 111 shown in FIG. 1. Based on the duty cycle, the driver circuit 422 and the inductance 432 transfer charge between cells 402, 404 to equalize output voltages of the cells 402, 404 during charging and discharging. The driver circuit 424 and the inductance 434 transfer charge between cells 404, 406 to equalize output voltages of the cells 404, 406 during charging and discharging, and so on. As shown in FIG. 9, the PWM control module 420 may drive and/or otherwise control the driver circuits 422, 424, 426, 428, 330 separately and in parallel.

For example, when a charge level of cell 402 is less than the charge level of cell 404, the driver circuit 422 and the inductance 432 transfer charge from cell 404 to cell 402. Due to the charge transfer, however, the charge level of 404 may become less than the charge level of cell 406. Accordingly, the driver circuit 424 and the inductance 434 may transfer charge from cell 406 to cell 404, and so on. Although not shown, a switch similar to the switch 119 may be used to provide over-discharge protection for the battery stack.

In FIGS. 8 and 9, the maximum number of cells in the battery stacks (i.e., the maximum value of N) in the power management systems 300, 400 may differ. For example, the maximum value of N in the power management system 300 may be greater than the maximum value of N in the power management system 400.

The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A charge-balancing system comprising:
   N circuits each including:
      a first switch connected in series to a second switch; and
      an inductance having a first end connected between the first switch and the second switch; and
   a control module configured to generate control signals to control the first switch and the second switch, where N is an integer greater than or equal to 1,
   wherein a second end of the inductance of a first circuit of the N circuits is connected between two cells of a first pair of 2N series-connected cells of a battery stack,
   wherein the first switch and the second switch of the first circuit are connected in parallel to the first pair of 2N series-connected cells,
   wherein the control module is configured to transfer charge between the two cells of the first pair of 2N series-connected cells via the inductance until a difference between respective output voltages of the two cells of the first pair of 2N series-connected cells is less than or equal to a predetermined threshold, and
   wherein the predetermined threshold is not equal to zero.

2. The charge-balancing system of claim 1, wherein the control module is configured to transfer charge between the two cells of the first pair of 2N series-connected cells via the inductance based on a duty cycle of the control signals during at least one of a charging cycle and a discharging cycle of the battery stack.

3. The charge-balancing system of claim 1, wherein when a first cell of the first pair of 2N series-connected cells charges faster than a second cell of the first pair of 2N series-connected cells, the control module is configured to transfer a first charge from the first cell of the first pair of 2N series-connected cells to the second cell of the first pair of 2N series-connected cells via the inductance based on a duty cycle of the control signals.

4. The charge-balancing system of claim 3, wherein the control module is configured to transfer the first charge in response to a state of charge of the first cell of the first pair of 2N series-connected cells being less than a fully charged state by a first predetermined threshold.

5. The charge-balancing system of claim 4, wherein the control module is configured to transfer a second charge from the second cell of the first pair of 2N series-connected cells to the first cell of the first pair of 2N series-connected cells during a discharge cycle in response to the state of charge of the first cell of the first pair of 2N series-connected cells being greater than a fully discharged state by a second predetermined threshold.

6. The charge-balancing system of claim 5, wherein the control module is configured to transfer the second charge until a first output voltage of the first cell of the first pair of 2N series-connected cells is greater than a second output voltage of the second cell of the first pair of 2N series-connected cells.

7. The charge-balancing system of claim 1, wherein the control module is configured to adjust a duty cycle of the control signals based on an output voltage of the battery stack during at least one of a charging cycle and a discharging cycle of the battery stack.

8. The charge-balancing system of claim 1, further comprising a voltage sensing module configured to
   sense a first voltage across the first pair of 2N series-connected cells,
   sense a second voltage at the second end of the inductance, and
   determine respective output voltages of the two cells of the first pair of 2N series-connected cells based on the first voltage and the second voltage.

9. The charge-balancing system of claim 8, wherein the control module is configured to adjust a duty cycle of the control signals based on at least one of the output voltages during at least one of a charging cycle and a discharging cycle of the battery stack.

10. The charge-balancing system of claim 1, further comprising a signal generating module configured to generate the control signals and to modulate pulse widths of the control signals based on a duty cycle determined by the control module.

11. The charge-balancing system of claim 1, further comprising a control switch configured to disconnect the battery stack in response to an output voltage of the battery stack decreasing to less than a predetermined voltage.

12. The charge-balancing system of claim 1, wherein when N is greater than or equal to 3,
   a second end of an inductance of a second circuit of the N circuits is connected between two cells of a second pair of 2N series-connected cells of the battery stack;
   a first switch and a second switch of the second circuit are connected in parallel to the second pair of 2N series-connected cells;
   the first pair of 2N series-connected cells and the second pair of 2N series-connected cells are connected in series; and
   the second switch of the first circuit is connected to the first switch of the second circuit.

13. The charge-balancing system of claim 12, wherein:
- a second end of an inductance of a third circuit of the N circuits is connected between (i) the second switch of the first circuit and (ii) the first switch of the second circuit; and
- a first switch and a second switch of the third circuit are connected in parallel to the first pair of 2N series-connected cells and the second pair of 2N series-connected cells.

14. The charge-balancing system of claim 13, wherein when N is greater than or equal to 5,
- a second end of an inductance of a fourth circuit of the N circuits is connected between two cells of a third pair of 2N series-connected cells of the battery stack;
- a first switch and a second switch of the fourth circuit are connected in parallel to the third pair of 2N series-connected cells;
- the second switch of the fourth circuit is connected to the first switch of the first circuit; and
- the third pair of 2N series-connected cells is connected in series to the first pair of 2N series-connected cells and the second pair of 2N series-connected cells.

15. The charge-balancing system of claim 14, wherein:
- a second end of an inductance of a fifth circuit of the N circuits is connected between (i) the second switch of the fourth circuit and (ii) the first switch of the first circuit; and
- a first switch and a second switch of the fifth circuit are connected in parallel to the third pair of 2N series-connected cells and the first pair of 2N series-connected cells.

16. The system of claim 1, wherein the predetermined threshold is based on at least one of (i) types of cells, (ii) a total number of cells, (iii) voltage ratings of cells, and (iv) age of cells.

17. The system of claim 1, wherein the control module is configured to transfer the charge in response to a charge level of one of the two cells being (i) greater than or equal to a first predetermined value during a charging cycle or (ii) less than or equal to a second predetermined value during a discharging cycle, wherein the first predetermined value is greater than the second predetermined value.

\* \* \* \* \*